Oct. 18, 1960     J. G. NEWSOME     2,956,292

LAMINATED PLASTIC BOAT

Filed Aug. 13, 1956

INVENTOR.
JACOB G NEWSOME
BY
ATTY.

United States Patent Office 2,956,292
Patented Oct. 18, 1960

2,956,292

LAMINATED PLASTIC BOAT

Jacob G. Newsome, Bradenton, Fla., assignor to Newsome Fiberglass, Inc., Bradenton, Fla., a corporation of Florida Filed Aug. 13, 1956, Ser. No. 603,616

3 Claims. (Cl. 9—6)

This invention relates to a laminated plastic boat and has special reference to a boat having a laminated reinforced plastic hull.

More particularly, this invention relates to a laminated plastic boat comprising a one-piece hull with transversely spaced longitudinally extending rigid reinforcing beams permanently bonded thereto, there being a sub-flooring panel bonded to and supported by the reinforcing beams in a spaced relation with the hull whereby the spacing of the beams and panel form a plurality of independent watertight compartments.

In the present invention, the hull is formed of a laminate consisting of layers of materials of continuous construction, preferably alternate layers of glass mat and fibreglass cloth, permanently bound to each other by means of resins. The laminate may preferably be made by impregnating or saturating the glass material of continuous construction type with a high impact strength liquid resin; laying up or stacking individual plies of the impregnated material in the desired form, and bonding the plies together by converting the resin into a solid state with or without the application of heat and pressure to form a laminated fiberglass plastic.

The hull resulting from a one-piece laminate of the character above described has no screws, bolts or other metal fastenings common to the usual hulls fabricated from wooden or metal parts, and thus there are no seams or joints to open with the attendant necessity for caulking and scraping. Also, the laminate material requires no painting or like upkeep because the resins may be impregnated with any desired color. Nor will the hull dent, as in the case of aluminum, nor break in pieces as in the case of wood, during a collision.

The safety factor is a most important consideration in the design of any boat, and this factor depends upon the strength inherent in the structure to resist the violences of nature in storms and the like, together with the ability to stay afloat during such periods. The present invention accommodates both of these features to provide a maximum of safety in boating, the dual purpose channel beams forming flotation tanks with the hull to keep the boat afloat, and providing a network of reinforcing members to resist destruction by natural or artificial forces.

One of the objects of this invention is to provide a laminate plastic boat of the type indicated above which is reasonable in its original cost as well as in its maintenance cost, is comparatively light in weight and yet is durable.

Another object of this invention is to provide a laminated plastic boat of the character above mentioned which is highly resistant to shock and will not dent nor leak when subjected to usual abuses.

A still further object of this invention is to provide a laminated plastic boat as hereinbefore recited in which the reinforcing structure has a dual purpose of keeping the boat afloat as well as strengthening the hull to resist destructive forces.

It is also an object of this invention to provide a laminated plastic in the form mentioned above wherein the deteriorating influences of the elements are minimized.

Other objects and advantages will hereinafter be more fully described, and for a more complete understanding of the characteristic features of this invention, reference may be had to the following description when taken together with the accompanying drawings, in which latter:

Figure 1:
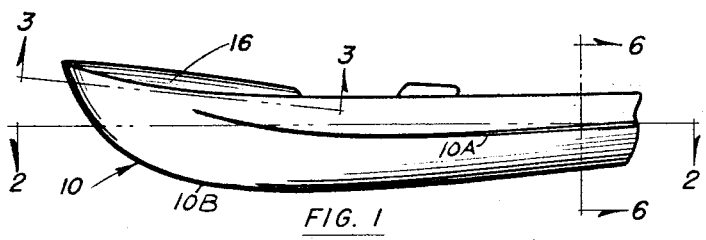
Fig. 1 is a side elevational view of the laminated plastic boat incorporating the features of this invention.
Figure 2:
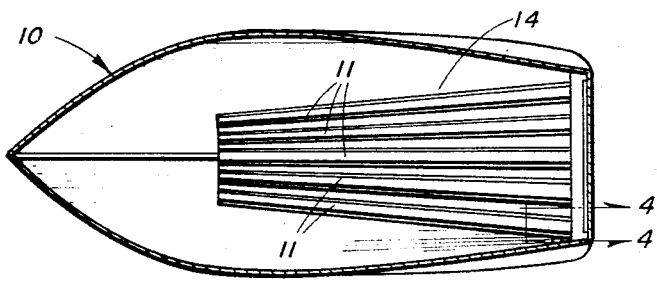
Fig. 2 is a plan sectional view taken on the lines 2—2 of Figure 1.
Figures 3, 4, 5:
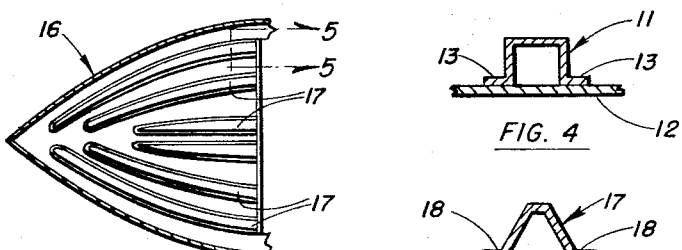
Fig. 3 is an inverted plan sectional view taken on the lines 3—3 of Figure 1.
Fig. 4 is an enlarged detail sectional view taken on the lines 4—4 of Fig. 2.
Fig. 5 is an enlarged detail sectional view taken on the lines 5—5 of Fig. 3.

Referring now to the drawings and more particularly to Figures 1 and 2 thereof, this invention embodies a hull 10 preferably comprising a one-piece laminate of layers of fibrous materials of continuous construction, preferably alternate layers of glass mat and fibre glass cloth, permanently bound to each other by means of resins. As can best be determined from Figure 6, the hull 10 includes a plurality of integral offset portions 10A and 10B which extend substantially the length of the hull and which serve in a dual capacity in this construction. The portions 10A are disposed in a spaced relation with the top of the hull 10 and serve to reinforce the sides thereof as well as act as splash rails to deflect water spray away from the passenger compartment. Portion 10B serves as a keel and also to reinforce the bottom of the hull. A plurality of transversely spaced longitudinally extending rigid reinforcing beams 11 are permanently bonded to the bottom or floor 12 of the hull 10 in a watertight relationship therewith as by means of the same resin used in the bonding of the laminate of the hull.

The beams 11 are preferably of channel shape, the free edges of the channels having integrally formed flanges 13 extending in directions outwardly therefrom to rest on the floor 12. The beams 11 are preferably formed of the same materials and in the same maner as the hull and are contoured to conform to the shape of that portion of the floor 12 where they are to be mounted by bonding the flanges 13 to the hull by means of a common resin. The bonding of the flanges 13 of the beams 11 to the floor 12 of the hull 10 creates a plurality of water-tight flotation compartments or air tanks within the channel beams, the ends of the channel beams being suitably closed.

While the beams 11 are arranged in a modified fan shape in a longitudinal direction, their positioning may be altered at will to accommodate varying structural arrangements of the accessories with which a boat is usually fitted. Also, the beams extend preferably over at least a major portion of the length of the floor 12 to provide the maximum reinforcement of the hull.

Figure 6:
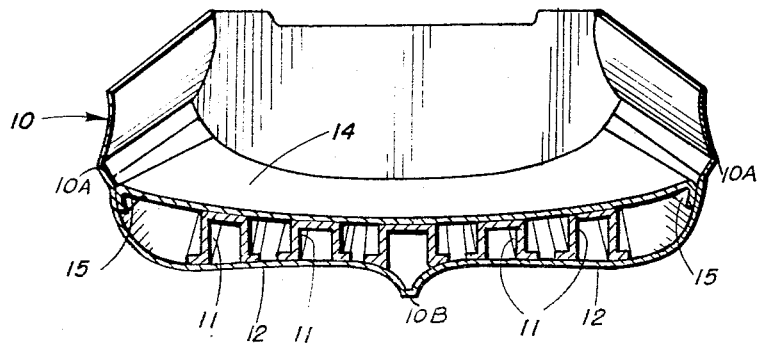
Fig. 6 is an enlarged sectional view taken on the lines 6—6 of Figure 1.

A sub-flooring panel 14, shaped to the general inside contour of the bottom of the hull, is mounted on a curved plane substantially coextensive with the tops of the channel beams 11. A continuous flange 15, extending from the edges of the panel, is bonded to the hull as best illustrated in Figure 6, and the body portion of the panel intermediate the flange is bonded to and supported by the tops of the channel beams 11.

The panel 14 is preferably of the same material as the hull and the beams, and the bonding material is a resin common to all. The bonding of the sub-flooring to the channel beams 11 and to the hull 10 creates a plurality of independent water-tight compartments between the channel beams in addition to the aforedescribed watertight compartments within the channel beams. Also, the spaces between the outer channel beams and the hull create further water-tight compartments or air tanks.

In some instances it is desirable to provide a bow deck 16 of one piece with the hull, which, in addition to the usual function thereof, provides for greater safety and for greater rigidity because in this part as well, a plurality of reinforcing channel beams 17 may preferably be provided. These channel beams 17 include integrally formed flanges 18 extending outwardly from the free edges thereof for bonding to the deck 16 to create water-tight flotation compartments. Thus, this structure provides means defining a second group of independent flotation compartments which is isolated from the hull and from the first group of air compartments.

The channel beams 17 have their ends closed and are disposed in a general direction longitudinally of the boat although for convenience in design, they have an arcuate contour. The deck 16 and the channel beams 17 are preferably constructed of the same materials and in the same manner as the hull 10, sub-flooring 14, and the other channel beams 11.

In the event the body of water is cluttered with submerged logs or stumps of trees, the boat would have every chance of staying afloat because of the many watertight compartments it would be necessary to puncture, including the bow deck which is not subjected to the water's surface. Also, the reinforcement provided by the channel beams resists destruction by other natural or artificial forces.

While but a single embodiment of this invention is herein shown and described, it is obvious that modifications thereof will be apparent to those skilled in the art without departing from the spirit and scope of this invention and, therefore, this invention is to be limited only by the prior art and the scope of the appended claims.

I claim:

1. In a boat of the character described, a hull comprising a one-piece laminated structure consisting of fibrous material permanently bonded by a plastic resin, an outwardly offset keel portion forming an integral part of and reinforcing the bottom of said hull, outwardly offset splash rail portions forming an integral part of and reinforcing the sides of said hull and extending longitudinally substantially the length thereof, transversely spaced substantially longitudinally extending channel shaped beams made of said laminated fibrous material and permanently bonded to said hull, and a contoured sub-flooring panel of said laminated material permanently bonded to and supported by said beams in a spaced relation with said hull, said hull forming independent watertight compartments within said channel beams and between said beams and said spaced panel.

2. In a boat of the character described, a hull comprising a one-piece laminated structure consisting of fiberglass material permanently bonded by a plastic resin, means defining a first group of independent flotation compartments adjacent the hull of said boat, said means including a plurality of transversely spaced channel shaped fiberglass beams extending longitudinally of said hull and having flange portions permanently bonded to said hull, and a fiberglass sub-flooring panel bonded to and supported by said beams in a spaced relation with said hull, and means defining a second group of independent flotation compartments isolated from said first group and said hull, said means comprising a fiberglass deck enclosing a portion of said hull, and a plurality of spaced channel shaped beams permanently bonded to said deck.

3. In a boat of the character described, a hull comprising a one-piece laminated structure including integral offset keel and splash rail portions extending longitudinally of and reinforcing said hull, said splash rails being disposed in a spaced relation with the top portion of said hull, said structure consisting of fiberglass material permanently bonded by a plastic resin, a plurality of transversely spaced longitudinally extending rigid one-piece laminated fiberglass reinforcing beams of channel shape having outwardly extending flange portions permanently bonded to said hull, and a laminated fiberglass flanged sub-flooring panel having the body portion spaced from said hull and permanently bonded to and supported by said reinforcing beams, said flange portions being bonded to said hull, said hull forming independent water-tight compartments within said channel beams and between said beams and said spaced panel.

References Cited in the file of this patent

UNITED STATES PATENTS

| 316,881 | Dobbins | Apr. 28, 1885 |
| 2,379,883 | Clement | July 10, 1945 |
| 2,406,051 | Weiss | Aug. 20, 1946 |
| 2,417,586 | Crosley | Mar. 18, 1947 |

FOREIGN PATENTS

| 532,724 | Great Britain | Jan. 29, 1941 |